United States Patent [19]

Utsumi et al.

[11] Patent Number: 4,984,232
[45] Date of Patent: Jan. 8, 1991

[54] COMPATIBLE OPTICAL DISK

[75] Inventors: Kenichi Utsumi, Zama; Nagaaki Koshino, Yokohama; Yasuyuki Goto, Atsugi; Iwao Tsugawa, Machida; Masahiro Nakada, Atsugi, all of Japan

[73] Assignee: Fujitsu Limited, Kawasaki, Japan

[21] Appl. No.: 333,288

[22] Filed: Apr. 5, 1989

[30] Foreign Application Priority Data

Apr. 8, 1988 [JP] Japan ................................ 63-085161

[51] Int. Cl.$^5$ .............................................. G11B 7/26
[52] U.S. Cl. ................................. 369/277; 369/275.2; 369/284; 346/137
[58] Field of Search ...................... 369/100, 272, 275.1, 369/275.2, 275.4, 277, 278, 279, 284; 346/76 L, 137; 365/106, 113; 428/209, 457, 910, 913; 430/945, 495

[56] References Cited

U.S. PATENT DOCUMENTS

| | | | |
|---|---|---|---|
| 4,322,839 | 3/1982 | Yamashita et al. | 369/288 X |
| 4,583,102 | 4/1986 | Tamura et al. | 346/137 X |
| 4,718,053 | 1/1988 | Sato et al. | 369/284 X |
| 4,725,502 | 2/1988 | Kiyomiya et al. | 369/288 X |
| 4,774,702 | 9/1988 | Giacomel | 369/284 X |
| 4,818,666 | 4/1989 | Gravesteijn et al. | 369/100 X |
| 4,855,984 | 8/1989 | Gerber | 369/275.1 |

FOREIGN PATENT DOCUMENTS

| | | | |
|---|---|---|---|
| 0226168 | 6/1987 | European Pat. Off. | 369/275.1 |
| 58-102795 | 6/1983 | Japan | 369/272 |
| 58-203643 | 11/1983 | Japan | 369/272 |
| 62-262242 | 11/1987 | Japan | 369/272 |
| 2131222 | 6/1984 | United Kingdom | 369/279 |

Primary Examiner—Bentsu Ro
Attorney, Agent, or Firm—Staas & Halsey

[57] ABSTRACT

A compatible optical disk in which information can be reproduced by a player normally used exclusively for reproduction, and writing, rewriting and erasure can be performed, comprises a recording film material characterized in that the reflectivity of a flat portion of the disk is lower than 50% in an erased or unrecorded state and the reflectivity of a recorded area is increased by recording by an irradiation of light, a light beam-guiding groove (12) formed on the surface of the disk substrate so that information is recorded or read out along the trough portion (12) or crest portion (17) of the guiding groove, and the reflectivity is enhanced in the crest portion (17) between the troughs or in the trough portion (12) between the crests.

12 Claims, 2 Drawing Sheets

COMPATIBLE OPTICAL DISK

BACKGROUND OF THE INVENTION

(1) Field of the Invention

The present invention relates to a compatible optical disk. Namely, the present invention relates to a rewritable optical disk compatible with a compact disk (CD) used exclusively for reproduction. More particularly, the present invention relates to an optical disk in which information can be reproduced by using a commercially available standard CD player and writing, rewriting, and erasure can be performed.

(2) Description of the Related Art

Compact disks are industrially valuable because they enable users to easily utilize large information (voices, images and the like) capacities normally used exclusively for reproduction, at a low cost. Nevertheless, where writing, rewriting, or a partial change of information is desired, a new original disk must be prepared, and this incurs much expense and time. Accordingly, if a CD used exclusively for reproduction can be made writable or rewritable, and a conventional player normally used exclusively for reproduction can be used for a reproduction of information stored in this disk, a valuable contribution to society can be made since CD players already widely available can be effectively utilized.

Rewritable optical disks and additional write type optical disks in which information can be only recorded have been intensively investigated, and disks of this type have been marketed.

In disks of this type, however, to increase the recording sensitivity, the absorption of light is enhanced, and thus the reflectivity is kept to a low level, and accordingly, information cannot be read out by commercially available CD players. Namely, a reflectivity of at least 70% is stipulated as the standard value for a CD used exclusively for reproduction, and players are constructed to comply with this standard, but the reflectivity of rewritable optical disks or additional write type optical disks is generally as low as 15 to 50%. Furthermore, additional write type optical disks are usually perforation type, i.e., holes are formed in the recorded areas, and accordingly, the reflectivity is almost 0% in the recorded areas. Therefore, the reflectivity in the recorded area is lower than the reflectivity before the recording, and for this reason also, reproduction by CD players is impossible.

To provide a compatible writable or rewritable optical disk in which reproduction is possible by a standard CD player, the reflectivity of the disk must be increased, but this increase of the reflectivity results in a reduction of the recording sensitivity.

Furthermore, to perform the recording, the recording beams must be positioned in the form of tracks at a predetermined part of the disk. If information is already recorded, it is possible for information tracks to be traced, but if the disk is unrecorded and has no specific structure, it is very difficult to position tracks for the recording, and a guidance structure is required.

Usually, a groove is used as the guidance structure, and the shape of the guide groove must satisfy certain conditions. For example, where a signal is recorded along a trough portion, a condition represented by the following inequality must be satisfied:

$$\text{average reflectivity of trough portion} < \text{average reflectivity of crest portion} \quad (1)$$

If this condition (1) is not satisfied, for a CD player wherein a 3-beam tracking system is adopted, light beams trace the crest portion and the signal cannot be reproduced. To satisfy the condition (1), the width of the trough portion must be narrowed, but if the width of the trough portion is narrowed, the amplitude of the signal is reduced and the CN ratio (carrier/noise ratio) is reduced.

SUMMARY OF THE INVENTION

According to the present invention, the above problems are solved by using a recording material which is characterized in that the reflectivity of the disk in an unrecorded state is lower than 50%, and when recording is effected by an irradiation of light, the reflectivity of the irradiated area of the recording film is increased. As a material having such properties, a phase transition type InSb alloy crystal film can be used, for example. Furthermore, a film can be used in which fine convexities and concavities are preformed, the reflectivity is reduced in an unrecorded state by scattering on the convexities and concavities, but by irradiation with light, the convexities and concavities are flattened to increase the reflectivity. More specifically, a light beam-guiding groove, for example, one spiral groove, is formed on a disk substrate so that information is recorded or read out along the trough portion (or crest portion) of this guiding groove, and the reflectivity of the crest portion (or trough portion) between the troughs (or crests) is enhanced.

More specifically, in accordance with the present invention, there is provided a compatible optical disk in which a writing or rewriting of information is possible, this optical disk comprising a transparent substrate, a light beam-guiding groove formed on one surface of the substrate and a recording film or a multi-layer film including a recording film, which is formed on the groove-formed surface of the substrate, wherein information is recorded, erased or reproduced by an irradiation of light beams along the trough portion or crest portion of the groove; the reflectivity of the recording film is changed by an irradiation of light to record or erase information; the reflectivity of the optical disk observed from the side of the transparent substrate is lower than 50%, preferably 10 to 45%, in the flat portion of the substrate in an unrecorded state, and the reflectivity is increased when a recorded state is produced by an irradiation of light; when the reflectivity of the crest portion is enhanced and the reflectivity is locally increased by recording information along the trough portion, if the reflectivity is observed by an optical head, the average reflectivity of the information-recorded trough portion is not higher than the reflectivity of the crest portion between the troughs; or wherein when the reflectivity of the trough portion is enhanced and the reflectivity is locally increased by recording information along the crest portion, when the reflectivity is observed by the optical head, the average reflectivity of the information-recorded crest portion is not higher than the reflectivity of the trough portion between the crests.

DESCRIPTION OF THE PREFERRED EMBODIMENTS

Figure 1A:
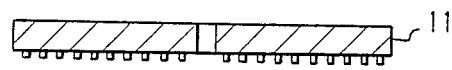
FIGS. 1A and 1B are cross-sectional and plane views illustrating an embodiment of the compatible rewritable optical disk of the present invention.

According to the CD standard, the light beam-guiding groove comprises one spiral groove, and the direction of rotation is counterclockwise from the inner circumference to the periphery, seen from the side of the groove-formed surface. In the present invention, the pitch of the light beam-guiding groove is 1.5 to 2.0 μm, preferably 1.6 to 2.0 μm, the depth of the trough portion of the groove is 0.03 to 0.11 μm, preferably 0.03 to 0.06 μm, and the width of the trough portion or crest portion of the groove is 0.5 to 1.0 μm, preferably 0.7 to 1.0 μm. Preferably, the crest portion between the troughs is flat.

As a preferred example of the recording film used in the present invention, there can be mentioned a crystal film of an alloy represented by the following formula:

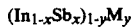

$(In_{1-x}Sb_x)_{1-y}M_y$ wherein x is a number of $0.5 < x < 0.7$ (atomic ratio), y is a number of $0 < y < 0.2$ (atomic ratio), and M is at least one member selected from the group consisting of Al, Si, P, Zn, Ga, Ce, As, Se, Ag, Cd, Sn, Te, Tl, Bi, Pb, Mo, Ti, Co, Ni, W, Au, Ge, and Pt.

According to the present invention using the above-mentioned material in which the reflectivity is increased by the recording, where the recording is carried out along the trough portion, the reflectivity is increased in the crest portion and at bits of the trough portion; or where the recording is carried out along the crest portion, the reflectivity is increased in the trough portion and at bits of the crest portion. Accordingly, a reflectivity (average reflectivity over the entire disk) enabling the use of a commercially available CD player is obtained. If the groove width is increased to solve the problem of reduction of the CN ratio caused when the groove width is narrowed, it is impossible to satisfy the above-mentioned condition (1). In this case, this disadvantage can be eliminated by increasing the reflectivity of the crest portion, and thus condition (1) can be satisfied.

Accordingly, in the present invention, even if the reflectivity is low in an unrecorded or erased state, no problems arise, and the present invention is advantageous in that the range of selection of the material of the recording film is broadened.

Moreover, since the condition (1) is satisfied, a satisfactory tracking error signal can be obtained even by a three-beam head, and therefore, signals can be read out by a stable tracking using a commercially available CD player.

According to the present invention, there is provided an optical disk in which information can be read out by a CD player in the same manner as from a conventional CD used exclusively for reproduction, moreover the optical disk is rewritable. Accordingly, in the disk of the present invention, rewriting can be easily accomplished as required, and the disk of the present invention is easy to use and is inexpensive. Therefore, the practical and industrial importance of the present invention is high.

The present invention will now be described in detail with reference to the following examples.

EMBODIMENT 1

Figure 1B:
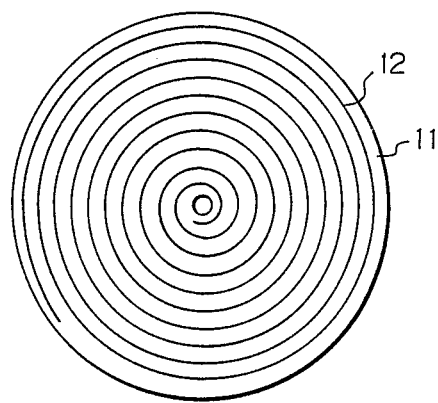
Figure 2:
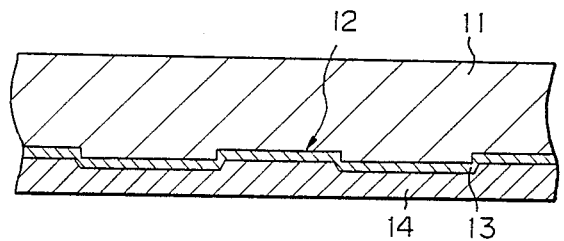
FIG. 2 is a partially enlarged sectional view of the optical disk shown in FIGS. 1A and 1B.
Figure 5:
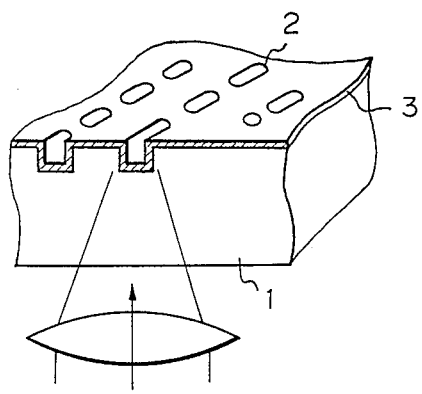

FIG. 1 illustrates a compatible rewritable optical disk according to one embodiment of the present invention, and FIG. 2 is a partially enlarged sectional view of the disk shown in FIG. 1. The disk (substrate) 11 has a shape specified by the CD standard, i.e., a thickness of 1.2 mm, an outer diameter of 120 mm, and an inner hole diameter of 15 mm. In a disk to be used exclusively for reproduction, in general, as shown in FIG. 5, many information pits 2 formed on the surface of a substrate 1 are spirally connected to one another, and a reflecting film 3 of aluminum covers the pit-formed surface. The disk of the present embodiment is different from this conventional disk in that one spiral groove 12 is formed instead of the pits 2; the turning pitch of the groove 12 being 1.6 μm, and the direction of rotation of the spiral being counterclockwise from the inner circumference to the periphery, seen from the side of the surface at which the groove 12 is present. The groove 12 has a depth of 0.05 μm and a width of 0.7 μm, and the portion other than the groove, i.e., the crest portion, is flat.

A recording film 13 is formed on the grooved substrate 11, and a protecting film 14 is formed on the recording film 13. The recording film 13 is, for example, an alloy crystal film obtained by a vacuum deposition of In and Sb, which comprises 45 atomic % of In and 55 atomic % of Sb. The protecting film 14 is formed, for example, by coating and curing a UV-curable resin, and the thickness of the protecting film 14 is 50 μm.

The initial reflectivity of the disk is about 40% in the flat portion of the disk, but if the disk is irradiated with strong laser beam pulses for a short time, the reflectivity is increased to about 60%. If the recording film 13 is irradiated in this state with relatively weak laser beams, the reflectivity is again reduced to the initial value of 40%. Accordingly, if the high-reflectivity state is used for recording and the low-reflectivity state is used for erasure, information can be repeatedly rewritten.

If a third element is incorporated into the InSb alloy crystal film, valuable as the recording film, other characteristics thereof can be improved without degradation of the reflectivity or rewritability. For example, the long-term storage of information can be improved by an addition of Se, Si, Ge, Te, Tl, Al, As or Sn, and an increase of the rewriting times can be obtained by an incorporation of P, Zn, As, Cd, Ag, Ti, Au, Pd, Pt, Sn, Pb, Ga, Mo or W. Furthermore, an improvement of the recording and erasure sensitivity can be obtained by an incorporation of Al, Bi, Cd, Pb or Ga.

InSb alloy type crystal films, and similar crystal recording films valuable as a material for recording information by changing the crystal state by an irradiation of light, and thus changing the reflectivity, are disclosed by Japanese Patent Application No. 59-255672, No.

59-255673, No. 59-274502, No. 59-274537, No. 60-6669, No. 60-6670, No. 60-6671 and No. 60-67983.

In those inventions, the disk is rotated at a linear velocity of 5 m/sec, and direct-current (dc) laser beams are applied along the crest portion of the disk on the disk surface at a power of 10 mW by using an optical head; the beam diameter being smaller than 1 μm. The reflectivity in the crest portion is increased by about 1.5 times that of the level before irradiation, and the reflectivity of the trough portion of the groove is not changed. Information is recorded at the trough portion 12 in the disk having an increased or enhanced reflectivity at the crest portion.

Figure 3:
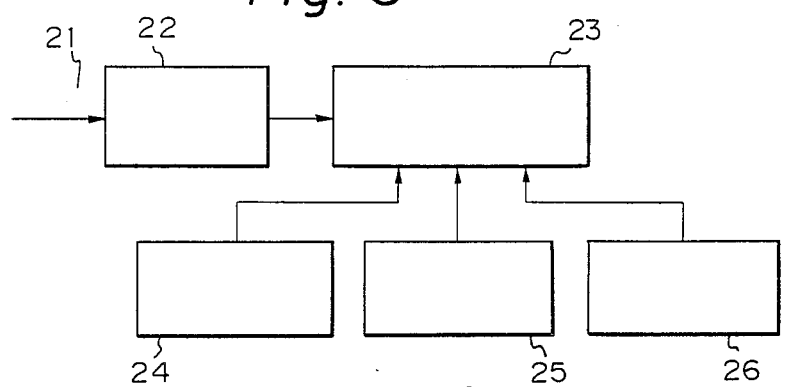
FIG. 3 is a diagram of the structure of an apparatus which records information in the compatible rewritable optical disk of the present invention and renews the recorded information with new information.

FIG. 3 illustrates the structure of an apparatus for recording information or renewing recorded information with new information in the compatible rewritable optical disk of the present invention. Information 21 in 8-bit units to be recorded is subjected to the signal transformation (ECC or modulation) 22 stipulated by the standard and output to a recording drive 23, which is substantially the same as the recording drive of the conventional additional write type apparatus. Namely, semiconductor laser beams converged to a beam diameter smaller than 1 μm are applied along the spiral groove to record the information in the recording film. At this step, known means such as a tracking servo 24, a focus servo 25, and a rotational servo 26 are used. The speed of rotation of the disk is controlled in accordance with the radial position of the irradiation, to obtain a constant linear velocity (CLV) of, for example, 1.2 to 1.4 m/sec.

The intensity of the semiconductor laser is modulated according to the information signals, and the peak power is kept within 5 to 10 mW. The reflectivity is increased in the area irradiated with a high output power of laser beam, and accordingly, high reflectivity areas and low reflectivity area are formed, and the information is recorded.

Figure 4:
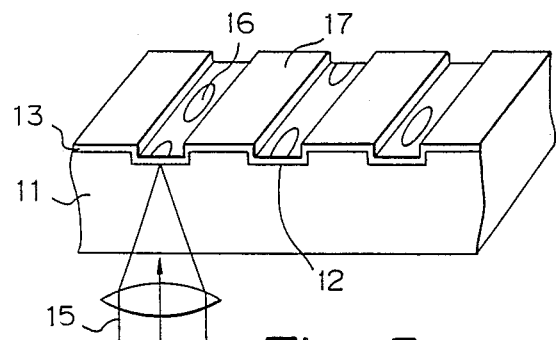
FIG. 4 is a perspective view illustrating the state of recording, rewriting or reproducing information in the compatible rewritable optical disk of the present invention; and, FIG. 5 is a diagram of a CD used exclusively for reproduction.

FIG. 4 shows the state of recording or reproduction of information in the compatible rewritable optical disk of the present invention. In FIG. 4, the substrate 11, guide groove 12, and recording film 13 are the same as those shown in FIG. 2, 15 represents laser beams and 16 represents an information-recorded reflectivity-increased portion of the recording film 13. Reference numeral 17 represents the crest portion having the same state as the recorded portion 16 in the guide groove 12 and an increased reflectivity.

In the disk in which the reflectivity is increased in the crest portion 17 and information is recorded in a predetermined format in the groove 12, the information can be reproduced even by a commercially available player used exclusively for reproduction. Namely, this disk is compatible. In this case, the problem is whether or not the servo focussing and servo tracking can be accomplished stably. In the disk having an increased reflectivity, according to the present invention, the problem of the magnitude of the focus error signal does not arise, and therefore, focussing can be performed without trouble by any commercially available player.

While for tracking, since two tracking systems are available, a practical test should be carried out for each system.

The first system is a push-pull system in which a tracking signal is obtained by utilizing light diffracted from a pit. This pit has substantially the same function as the groove formed on the disk of the present invention. As an example of this system, they can be mentioned a CD player, CD-1100SD1 supplied by Fujitsu-Ten, and when the disk of the present invention is mounted on this apparatus, voice information can be stably reproduced.

The second system is a three-beam system in which the optical beam is divided into three beams, information signals are read by the central beam, and tracking signals are taken in by the two beams on both sides. As an example of this system, there can be mentioned CDP-550-ESD supplied by Sony. When the disk of the present invention is mounted on this apparatus, voice information can be stably read out.

In contrast, in a disk in which the reflectivity of the crest portion is not enhanced, the condition (1) is not satisfied, and a stable read-out is impossible.

Once-recorded information can be renewed with other information in the following manner.

The recorded disk of the present invention is mounted on the write-erase machine, and beams are applied along the information track under tracking, focussing and rotational servo (CLV) procedures as in the first recording. At this step, the recorded information track (groove 12) is irradiated by dc laser beams having a peak power corresponding to 40 to 60% of the peak power at the recording procedure, whereby the reflectivity of the information track 12 is uniformly returned to the low level and the recorded information can be completely erased.

At this point, the reflectivity of the crest portion remains high and is at the same level as the level before the erasure. Therefore, new information can be recorded on the disk in the same manner as described above. Namely, rewriting can be performed.

EMBODIMENT 2

The same substrate as used in Example 1 is prepared, and an $In_{45}Sb_{55}$ alloy crystal film is vacuum-deposited on the substrate.

The disk is then mounted on a recording apparatus, and the surface of the disk is irradiated by dc laser beams having a power of 10 mW, along the groove 12 (trough portion) while maintaining a linear velocity of 5 m/sec.

The disk is then placed in a sputtering apparatus, and reverse sputtering is carried out under an argon gas pressure of 0.2 Pa at the RF power of 200 W, for 5 minutes, whereby portions not irradiated by the laser beams, i.e., the crest portion 17 or the flat portion on which the groove is not formed, are etched. Namely, the In-Sb alloy film remains only in the trough portion. Silicon dioxide is then deposited by sputtering to a thickness of 100 nm, and subsequently, aluminum is deposited to a thickness of 40 nm.

The disk was removed from the sputtering apparatus, and an examination of the reflectivity by an optical head, confirmed that the reflectivity of the flat portion was 75%. At this time, the In-Sb film of the trough portion 12 was in the recorded state, and the condition (1) is satisfied in the disk. When the disk is irradiated with dc beams having a power of 4 mW at a linear velocity of 1.4 m/sec, the In-Sb alloy film of the trough portion is returned to the erasure state. The protecting film 14 may be formed on the aluminum layer as mentioned above.

When information is written in this disk in the manner as described in Example 1, signals can be reproduced by any CD player.

We claim:

1. A compatible optical disk in which a writing or rewriting of information is possible, said optical disk comprising a transparent substrate (11), a light beam-guiding groove (12) formed on one surface of the substrate and a recording film (13) or a multi-layer film including a recording film, formed on the groove-formed surface of the substrate, wherein information is recorded, erased or reproduced by irradiation of light beams along a trough portion (12) or crest portion (17) of said groove; a reflectivity of the recording film (13) is changed by an irradiation of light to record or erase information; a reflectivity of the optical disk observed from the side of the transparent substrate is lower than 50% in an unrecorded state and the reflectivity is increased when a recorded state is produced by an irradiation of light; where the reflectivity of the crest portion (17) is enhanced and the reflectivity is locally increased by recording information along the trough portion (12), where the average reflectivity of the information-recorded trough portion (12) is not higher than the reflectivity of the crest portion (17) between the troughs, when the reflectivity is observed by an optical head; or wherein when the reflectivity of the trough portion (12) is enhanced and the reflectivity is locally increased by recording information along the crest portion (17), the average reflectivity of the information-recorded crest portion (17) is not higher than the reflectivity of the trough portion (12) between the crests, when the reflectivity is observed by the optical head.

2. An optical disk as set forth in claim 1, wherein the light beam-guiding groove (12) is one spiral groove.

3. An optical disk as set forth in claim 1, wherein information is recorded, erased and reproduced along the trough portion (12).

4. An optical disk as set forth in claim 1, wherein a phase transformation type material is used for the recording film, and the crystal state thereof is changed by an irradiation of light to change the reflectivity and this change is utilized for recording or erasing information.

5. An optical disk as set forth in claim 1, wherein the crest portion (17) is kept in a recorded state to enhance the reflectivity at the crest portion.

6. An optical disk as set forth in claim 5, wherein the crest portion (17) is brought to a recorded state by a direct-current irradiation of light beams.

7. An optical disk as set forth in claim 1, wherein the recording film is a film of an alloy represented by the following formula:

$$(In_{1-x}Sb_x)_{1-y}M_y$$

wherein x is a number of $0.5 < x < 0.7$, y is a number of $0 < y < 0.2$, and

M is at least one member selected from the group consisting of Al, Si, P, Zn, Ga, Ce, As, Se, Ag, Cd, Sn, Te, Tl, Bi, Pb, Mo, Ti, W, Au, Pt, Co, Ni, and Ge.

8. An optical disk as set forth in claim 4, wherein the reflectivity of the crest portion (17) is enhanced by removing the recording film of the crest portion (17) by etching, followed by forming a film of one of aluminum and gold.

9. An optical disk as set forth in claim 1, wherein the reflectivity of the flat portion of the substrate in an unrecorded state is 10 to 45%.

10. An optical disk as set forth in claim 1, wherein the pitch of the light beam-guiding groove is 1.5 to 2.0 μm.

11. An optical disk as set forth in claim 10, wherein the depth of the trough portion (12) of the groove is 0.03 to 0.11 μm.

12. An optical disk as set forth in claim 10, wherein the width of the trough portion (12) or crest portion (17) of the groove is 0.5 to 1.0 μm.

* * * * *

UNITED STATES PATENT AND TRADEMARK OFFICE
CERTIFICATE OF CORRECTION

PATENT NO. : 4,984,232
DATED : January 8, 1991
INVENTOR(S) : UTSUMI et al.

It is certified that error appears in the above-identified patent and that said Letters Patent is hereby corrected as shown below:

Col. 3, line 38, change "<" to --$\leq$--.
        line 39, change "<" to --$\leq$--.

Col. 8, line 15, change "<" (both occurrences) --$\leq$--.
        line 16, change "<" (both occurrences) --$\leq$--.

Signed and Sealed this

Twenty-ninth Day of June, 1993

Attest:

MICHAEL K. KIRK

*Attesting Officer*      Acting Commissioner of Patents and Trademarks